United States Patent [19]

Eckert

[11] Patent Number: 5,463,176
[45] Date of Patent: Oct. 31, 1995

[54] LIQUID WASTE OXYGENATION

[76] Inventor: C. Edward Eckert, 260 Lynn Ann Dr., New Kensington, Pa. 15068

[21] Appl. No.: 176,912
[22] Filed: Jan. 3, 1994
[51] Int. Cl.$^6$ ..................................................... C02F 3/22
[52] U.S. Cl. ........................... 210/622; 210/626; 210/627
[58] Field of Search .................................. 210/620, 622, 210/626, 627, 195.1, 220

[56] References Cited

U.S. PATENT DOCUMENTS

| | | | |
|---|---|---|---|
| 3,477,947 | 11/1969 | Kappe | 210/627 |
| 3,772,187 | 11/1973 | Othmer | 210/627 |
| 4,043,771 | 8/1977 | Anand | 210/220 |
| 4,085,041 | 4/1978 | Fullerton et al. | 210/626 |
| 4,226,717 | 10/1980 | Malm | 210/195.1 |
| 4,452,701 | 6/1984 | Garrett et al. | 210/627 |
| 5,186,841 | 2/1993 | Schick | 210/221.2 |
| 5,200,080 | 4/1993 | Bergman, Jr. et al. | 210/626 |

Primary Examiner—Christopher Upton
Attorney, Agent, or Firm—Andrew Alexander

[57] ABSTRACT

Disclosed is an improved method for oxygenation of liquid waste. The method comprises drawing a low pressure stream of liquid waste from a liquid waste tank and introducing an oxygen-containing gas thereto to provide a mixture of liquid waste and gas. Thereafter, the mixture is pumped into a high pressure stream wherein the pressure is maintained in the range of 50 to 1000 psig to obtain an oxygen enriched dispersion. The oxygen enriched dispersion is then discharged into the holding tank.

6 Claims, 2 Drawing Sheets

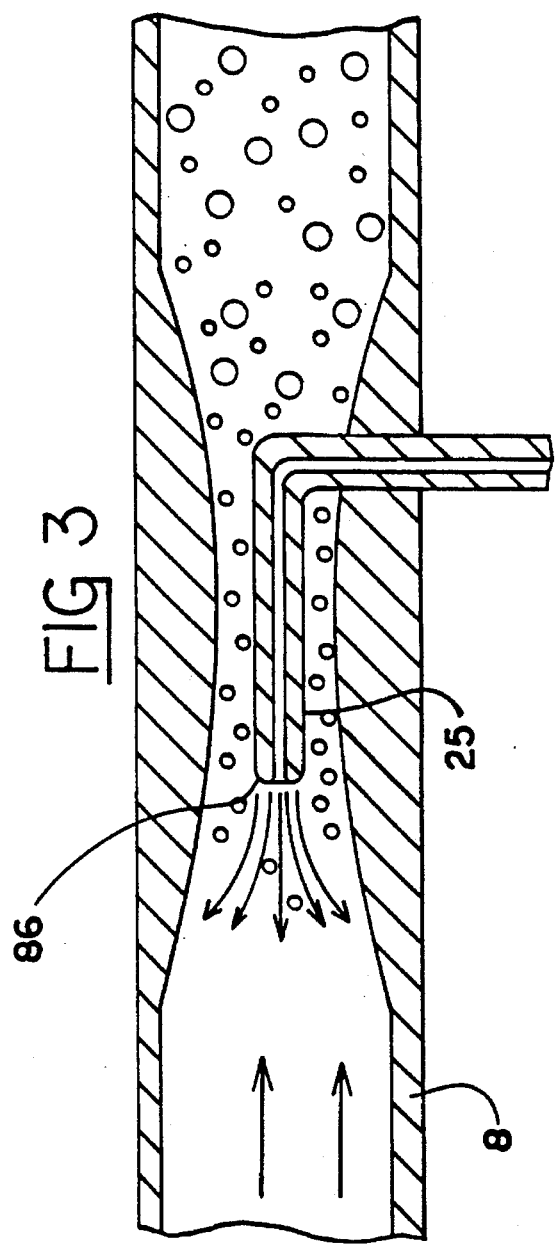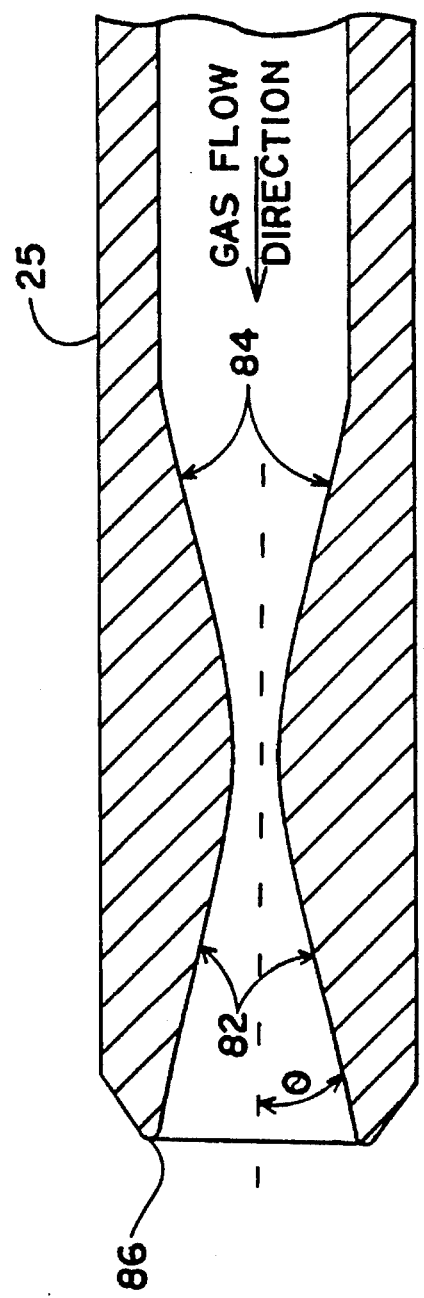

LIQUID WASTE OXYGENATION

BACKGROUND OF THE INVENTION

This invention relates to liquid waste and more particularly, it relates to improved oxygenation of liquid waste.

For the treatment of municipal wastewater, aerobic organisms work to consume the toxic material or break it down into a form which is safely discharged. The aerobic organism requires a constant supply of oxygen to survive. Oxygen can be supplied by bubbling air into the liquid waste or, in some cases, pure oxygen is supplied. U.S. Pat. No. 5,200,080 discloses the use of air and pure oxygen for the treatment of liquid waste. However, this patent discloses the use of both non-turbulent flow and turbulent flow and the use of pipe reducers to make the transition from non-turbulent flow to turbulent flow for uniform passage of oxygenated water to multiple eductors.

U.S. Pat. No. 4,085,041 discloses an oxidation and flotation apparatus for the treatment of sewage or other aqueous waste material using oxygen-containing gas bubbles.

U.S. Pat. No. 4,043,771 discloses oxygenation of sewage sludge by forcing the liquid downwardly through a perforated wall into a gas space in a vessel containing the liquid.

U.S. Pat. No. 5,186,841 discloses treating impure water by injecting ozone into a pressurized stream of water.

U.S. Pat. No. 4,226,717 discloses a waste water treatment system that provides an elongated grit chamber within the oxidation vessel.

However, blowing forced air into the liquid has the disadvantage or problem that it is expensive to operate large blowers to provide the necessary volume of air. Another problem with forced air is that a bacteria referred to as noccardia evidenced by large quantities of foam generated in the mixed liquor or aeration tank can develop. The noccardia bacteria can spread to the clarifier or can be carried in the wind with its attendant problems. Yet another problem with the use of forced air is that odors from the treatment system become airborne. Further, microorganisms or airborne pathogens in the aerobic system can be carried in the air and distributed in the vicinity of the sewage plant.

It will be seen that there are many problems attendant the use of forced air in an aeration system of a sewage plant. Thus, there is a great need for a simple, cost effective system that supplies oxygen-bearing gas for waste liquid treatment and that provides for efficient dissolution of the gas in waste liquid.

SUMMARY OF THE INVENTION

It is an object of the invention to provide an improved treatment system for municipal waste.

It is another object of the invention to provide a high pressure system for oxygenation of liquid municipal waste.

Yet, it is another object of the invention to provide oxygen-enriched gas to a high pressure waste liquid treatment system.

It is still another object of the invention to provide for improved dissolution of oxygen-bearing gas in liquid waste of a sewage treatment system.

Still further, it is another object of the invention to provide injection of oxygen-bearing gas into liquid waste at a low pressure and then to hold the oxygen-bearing gas in contact with the liquid waste at high pressure.

And still further, it is an object of the invention to provide a low pressure stream and a high pressure stream for treatment of liquid waste.

These and other objects will become apparent from the specification, drawings and claims appended hereto.

In accordance with these objects, there is provided an improved method for oxygenation of influent to a sewage treatment facility comprising providing a source of influent and providing a low pressure stream comprising water, an oxygen-containing gas is introduced through a nozzle to the low pressure stream to provide a mixture comprising water and gas. The mixture is pumped into a high pressure stream wherein the pressure is maintained in the range of 50 to 3000 psig to obtain an oxygen enriched dispersion. Thereafter, the oxygen enriched dispersion is discharged into the influent for purposes of oxygenation.

BRIEF DESCRIPTION OF THE DRAWINGS

FIG. 2 is a cross-sectional view of a supersonic nozzle for use in the present invention.

FIG. 3 is a cross-sectional view of a nozzle and pipe mixing chamber for mixing the gas and water.

DETAILED DESCRIPTION OF THE PREFERRED EMBODIMENTS OF THE INVENTION

Figure 1:
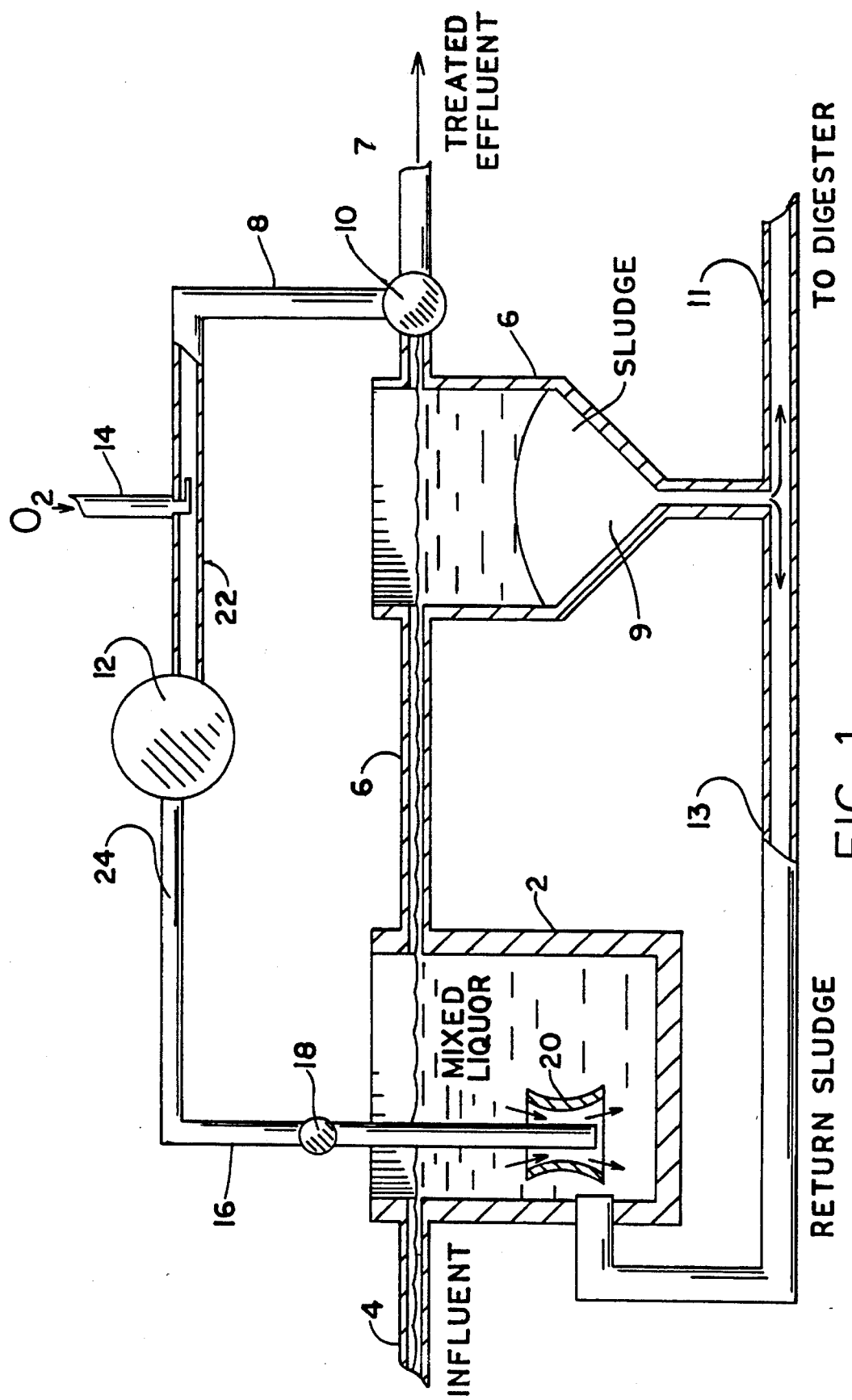
FIG. 1 is a flow chart showing steps of the invention.

Referring now to FIG. 1, there is shown a schematic of a liquid waste or sewage treatment system incorporating an embodiment of the invention. Thus, there is shown a liquid waste holding tank 2 having an inlet stream 4 for introducing untreated waste having dissolved oxygen content of less than 3 mg/l, e.g. water or sewage (herein referred to as influent) thereto and an outlet stream 6 for conveying mixed liquor to a settling tank 5. By the term mixed liquor as used herein is meant the influent mixed with oxygen-containing gas. The mixed liquor can contain 1 to 20 mg/l dissolved oxygen.

An outlet 7 is provided for removing treated effluent from settling tank 5. In tank 2, air can be added through an aeration means (not shown) or stirring means can be provided in tank 2 for purposes of agitation or mixing to provide a mixed liquor in accordance with the invention. Further, before the treated effluent is disposed of, it may be chlorinated. Solids in the mixed liquor entering tank 5 are permitted to settle out in bottom 9 to form a sludge. The liquid remaining on top of the sludge is referred to as treated effluent. The sludge may be removed to a digester along line 11 or recirculated along line 13 to be re-introduced to tank 2. Preferably, the treated effluent has a BOD (biological oxygen demand) of less than 40 and preferably less than 20 and typically less than 10. The BOD of influent being introduced along line 4 is typically on the range of 20 to 200 mg/l. Thus, influent or untreated waste to be treated in accordance with the invention is introduced along line 4 to holding tank 2.

In order to treat influent in tank 2 in accordance with the invention, a portion of the treated effluent exiting the system along line 7 is removed along pipe or line 8 which comprises a low pressure stream of treated effluent. For purposes of the invention, treated effluent may be pumped into line 8 by pump 10. Thereafter, treated effluent enters pump 12 that operates to pull treated effluent along line 8. By virtue of pumps 10 and 12 operating on line 8, there is created what is referred to as a low pressure stream of treated effluent that extends from pump 10 to pump 12. It will be appreciated that several pumps may be used to increase the pressure, all of which are contemplated within the invention.

Oxygen-containing gas is introduced into the low pressure stream through nozzle 14 to provide a mixture of treated effluent and oxygen-containing gas. The mixture then passes along line 16 through pressure controller 18 and dispersed in holding tank 2 where it is distributed through an eductor 20, for example.

The oxygen-containing gas may be injected substantially perpendicular to the treated effluent or in a direction counter to or in the same direction as the treated effluent flow. Preferably, the oxygen-containing gas is injected into the liquid stream substantially countercurrent to the flow direction of the treated effluent through pipe 8. Countercurrent injection of gas has the added advantage that more complete mixing is obtained between the oxygen-containing gas being injected and the treated effluent being contacted. For purposes of intensifying the mixing, the gas is injected under a pressure of about 25 to 675 psig and preferably 50 to 500 psig and typically 150 to 450 psig in the direction countercurrent to the liquid flow.

Also, further preferably, a nozzle is selected to enable injection of oxygen-containing gas under speeds which reach supersonic conditions at the exit of the nozzle. Thus, for purposes of the present invention, the velocity of the gas at the exit of the nozzle can be in the range of Mach 1 to Mach 5, with preferred ranges being Mach 2 to Mach 4, with a typical velocity being about Mach 3. When the gas is injected under supersonic conditions, it is preferred that it is injected substantially countercurrent to the flow direction of the solution. This enables more complete dissolution of the oxygen-containing gas in a very short period of time. It will be understood that lesser velocities, e.g., below Mach 1, can be used but these normally do not provide as much mixing and thus may be used on a less preferred basis.

For purposes of the present invention, the preferred nozzle has a design which permits supersonic gas flow conditions, as the gas exits the nozzle as noted. Such nozzle has a convergent-divergent design and is shown in FIG. 2. Thus, gas flow through nozzle 25 first converges at wall 84 until it reaches the smallest diameter before diverging and finally exiting nozzle 25. The angle at which walls 82 diverge is in the range of 3 to 10 degrees. Preferably, nozzle 25 has ends 86 which are contoured so as to provide low resistance to countercurrent liquid flow. This design has the effect of emitting the gas therefrom not only at supersonic velocity but in a fan-like configuration (see FIG. 3). This enables intimate contacting of the gas with the treated effluent passing through pipe 8. Thus, mixing and dissolution are very efficient. After injection of the treated effluent under these conditions, a two-phase gas and liquid suspension or emulsion is conveyed along pipe 8 to pump 12. Nozzle 25 can be fabricated from metal or ceramic material.

Pump 12 draws the mixture or dispersion in through inlet 22 and pumps it out through outlet 24 at an elevated pressure to provide a high pressure stream that extends from pump 12 to pressure controller 18. Liquid pressure controller 18 determines the level of pressure in line 16.

Thus, in the process of the invention, treated effluent is circulated from line 7 along low pressure line 8 where oxygen-containing gas is added and then pumped through 12 to high pressure stream 16, through pressure controller 18 and into tank 2.

Low pressure stream 8 is maintained below the pressure in the high pressure stream. In addition, pressure in the low pressure stream is maintained below the pressure of the oxygen-containing gas being introduced thereto. Thus, if air at atmospheric pressure is being introduced to the low pressure stream, the pressure of the low pressure stream can be below atmospheric pressure. However, in this invention, the pressure in low pressure stream 8 can be higher than atmospheric pressure when the oxygen-containing gas is pressurized. Thus, for purposes of the invention, the pressure in low pressure stream 8 can range from 5 to 550 psig, and preferably from 35 to 120 psig.

Introducing oxygen-containing gas into the low pressure stream has the effect of forming a gas/liquid dispersion which is ingested by pump 12 and then expelled into high pressure stream 16. The gas is maintained under pressure by compressing the liquid in line 16. Maintaining the gas under pressure in the treated effluent has the effect of efficiently dissolving large quantities of the gas in the liquid, e.g., 15 to 175 mg/l, in a short period of time. For example, the solubility of oxygen in water can range from about 29 mg/l at ambient temperature and pressure to about 950 mg/l at 500 psig inclusive of all numbers between these oxygen ranges and pressures. The solubility of oxygen in water at atmospheric pressure at 65° F. is 9.68 mg/l. In this manner, oxygen-containing gas can be more efficiently dispersed in holding tank 2 and more readily available to microorganisms.

When forced air is used to provide oxygen to tank 2, bubbles of air percolate up through the influent in an attempt to add oxygen. Thus, in the forced air system, oxygen added must permeate the bubble surface to dissolve in the influent, which is a limiting step in the efficiency of oxygen dissolution, regardless of whether the bubbles are large or small. By comparison, in the present invention, the oxygen-containing gas is already dissolved by virtue of the co-compression step of treated effluent and oxygen-containing gas. Accordingly, oxygen is dispersed in the influent by mixing the dispersion of treated effluent and oxygen-containing gas with influent. The contacting of influent with dispersion may be accomplished with eductor 20 wherein, as dispersion exits pipe 16 in eductor 20, it pulls influent through eductor 20 and accomplishes mixing. Several eductors may be used.

It should be noted that while the present invention is shown utilizing treated effluent, an independent source of water may be used. However, the use of treated effluent reduces any costs associated with the source of water.

The pressure in the high pressure stream can range from 50 to 3000 psig, preferably from 150 to 800 psig, and typically about 250 psig.

The rate of flow of the gas/liquid dispersion in line 16 can be in the range of 3 to 375 gals/minute with a preferred flow rate being in the range of 5 to 130 gals/minute.

Further, preferably in the present invention, the flow of the gas/liquid dispersion in line 16 is maintained under turbulent flow conditions to enhance and maintain gas/liquid phase contact. Thus, preferably the flow is maintained above the critical Reynolds Number (turbulent flow conditions), e.g. greater than 2100, particularly when the pressure in line 16 is maintained in the above pressure ranges. Under conditions of high oxygen content, for example, in line 16, then the Reynolds Number can be less than about 2100.

In the present invention, because of the pressure utilized in the Nigh pressure stream, the time period that the oxygen-containing gas is required to be in contact with the liquid stream for purposes of dissolution is greatly reduced. Thus, the time period for contact can be in the range of 100 milliseconds to 5 minutes, with a preferred time being in the range of 200 milliseconds to 1 minute, particularly when the pressure is maintained as noted herein, and the flow rate is maintained under turbulent flow conditions.

If oxygenated treated effluent is being distributed in holding tank 2 by distribution system 20, then a pressure reducer 18 is required to maintain pressure in line 16 in accordance with the invention. Pressure reducer 18 can be any pressure reducing means that will control the flow of liquid from the high pressure stream into distribution system 20. Thus, pressure reducer 18 can be a valve that is controlled to maintain the required pressure in the high pressure stream. The pressure reducer can be a fixed pipe restriction. Pump 12 is set to respond to the level of pressure in the high pressure stream to maintain the desired level of pressure. In another embodiment, pressure reducer 18 can comprise a hydraulic pump. Thus, the transition from high pressure stream 16 to distribution system 20 can be made by driving the hydraulic pump. The hydraulic pump may be used to pressurize air fed into the low pressure stream before the mixture is introduced to inlet 22 of pump 12. Low pressure stream 8 can be operated at a higher pressure when gas introduced thereto is pressurized.

While the invention has been described in terms of oxygenation of untreated waste or sewage, it will be understood that its application is not necessarily limited thereto. That is, the invention can be used for oxygenation or purification of all types of water. Hence, influent as used herein is meant to include water or sewage, for example.

The oxygen-containing gas referred to can include substantially pure oxygen or it can include air. If air is used, it can be beneficiated to provide oxygen beneficiated air. The air can be beneficiated by any means that enables oxygen beneficiated air. Such beneficiation may be accomplished by passing the air through a molecular sieve, or pressure swing adsorption can be used.

The use of the present invention has been described with respect to oxygenation but its use is not limited thereto. For example, water oxygenated with respect to the present invention can have medicinal applications such as hyperbaric oxygenation where it may be used to treat burn victims by providing oxygenated water, e.g., a DO of 500%, for baths to improve healing of the burn victims. It will be appreciated that the dissolved oxygen in water is more expeditiously transferred and held in contact with skin of the burn victim. In addition, the oxygenated water can be used for other topical skin applications, all of which are contemplated within the purview of the invention.

Further applications include artificial respiration utilizing a hydrophobic membrane.

Other applications of the invention include hydrogenation reactions where hydrogen is used in lieu of oxygen or high pressure chemical/bio-chemical reactions that use, for example, oxygen or free radical oxygen. Other gases or combination of gases may be dissolved in the manner taught by this invention. For example, nitrogen may be dissolved in water for corrosion control. In another use, bioreactors using high cell density are often limited in their productivity because oxygen transfer is limiting as metabolic oxygen demand is not met by oxygen transfer to the cell culture medium. In such bioreactors, the cell culture medium can be oxygenated external to the reactor by the present invention and then returned to the reactor where the cells are contained.

A further application is the hydrogenation of vegetable and other oils, which is carried out at 100° to 250° C. and at a pressure less than 200 psi in the presence of nickel or other catalyst. In this process, high pressure is used to increase hydrogen solubility, and thus reaction rate. Another example is the hydrogenation of heavy petroleum fractions in liquid phase to produce lighter fractions. Catalytic hydrogenation of crude oils is used to reduce sulfur and metallic content and increase the yield of distillate fractions.

In liquid phase oxidation, if oxygen concentration is high enough, organic materials or biological species can be chemically oxidized. Any and all of these applications are intended to be within the scope of this invention.

EXAMPLE

Influent comprising new sewage and having dissolved oxygen of less than 1 mg/l was first introduced into a holding tank approximately 150,000 gallon capacity. The holding tank had a throughput of 26,000 gallons/hour. Mixed liquor, which is influent mixed with oxygen-containing gas and microorganism, was introduced to a settling tank. Treated effluent having less than 10 BOD was discharged from the settling tank. A primary stream was drawn from the treated effluent at a rate of 60.5 liters/minute and pumped initially to a pressure of 55 psig at a temperature of 57° F. and at a dissolved oxygen concentration of 4.8 mg/l. Oxygen gas, substantially pure, was introduced to the primary stream at a rate of 5 liters/minute, at a gas pressure of 153 psig. The oxygen was introduced through a supersonic nozzle in a direction countercurrent to the flow of the primary stream to provide a dispersion of oxygen gas and treated effluent. The dispersion was then pressurized and compressed by a high pressure rotary pump to a pressure of 300 psig. This provided a high pressure treated effluent stream containing 71.3 mg/l dissolved oxygen. The high pressure stream was then discharged into the holding tank. The treated effluent from the settling tank had a dissolved oxygen content of about 3 mg/l. Thus, it will be seen that this method of introducing oxygen was effective in raising the dissolved oxygen from a level of less than 1 mg/l to a level of 3 mg/l.

Further, this method of introducing oxygen to the influent has the advantage that the presence of noccardia bacteria can be greatly reduced. Also, the power cost of introducing the oxygen in this manner can be less than half the power costs for operating blowers to produce forced air. In addition, because there is minimal use of forced air, odors and the spread of bacteria from the system are greatly reduced.

While the invention has been described in terms of preferred embodiments, the claims appended hereto are intended to encompass other embodiments which fall within the spirit of the invention.

What is claimed is:

1. An improved method for oxygenation of influent to a sewage treatment facility, comprising:

(a) providing a source of influent having a dissolved oxygen (DO) content of less than 3 mg/l;

(b) providing a low pressure stream comprising water having a DO content in the range of 0.5 to 20 mg/l;

(c) introducing an oxygen-containing gas through a nozzle to said low pressure stream to provide a mixture comprising water and gas, the gas being introduced at a velocity exiting said nozzle at supersonic conditions;

(d) pumping said mixture into a high pressure stream wherein the pressure is maintained in the range of 50 to 3000 psig to obtain an oxygen enriched dispersion having a DO content in the range of 15 to 175 mg/l, the pressure in said high pressure side being greater than the pressure in said low pressure stream; and (e) discharging said oxygen enriched dispersion into said source of influent for purposes of oxygenation of said influent to increase the oxygen level in said influent to provide a mixed liquor having a DO content in the range of 1 to 20 mg/l.

2. An improved method for oxygenation of influent to a sewage treatment facility, comprising:

(a) providing a source of influent;

(b) flowing a low pressure stream comprising water maintained at a pressure in the range of 5 to 550 psig;

(c) introducing an oxygen-containing gas through a nozzle to said low pressure stream to provide a mixture comprising water and gas, the gas introduced in a direction countercurrent to the direction of flow of said low pressure stream and the gas introduced at a velocity exiting said nozzle in a the range of Mach 1 to Mach 5;

(d) pumping said mixture into a high pressure stream wherein the pressure is maintained in the range of 50 to 1000 psig to obtain an oxygen enriched dispersion having a dissolved oxygen content in the range of 15 to 175 mg/l, the pressure in said high pressure side being greater than the pressure in said low pressure stream: and (e) discharging said oxygen enriched dispersion into said source of influent for purposes of oxygenation of said influent.

3. An improved method for oxygenation of influent to a sewage treatment facility, comprising:

(a) providing a source of influent having a dissolved oxygen (DO) content of less than 3 mg/l;

(b) providing a low pressure stream comprising water, the stream maintained at a pressure in the range of 35 to 120 psig;

(c) introducing an oxygen-containing gas through a nozzle to said low pressure stream to provide a mixture comprising water and gas, the gas introduced in a direction countercurrent to flow of said stream, the gas introduced at a supersonic velocity exiting said nozzle;

(d) pumping said mixture into a high pressure stream wherein the pressure is maintained in the range of 50 to 1000 psig to obtain an oxygen enriched dispersion having a dissolved oxygen content in the range of 15 to 175 mg/l, the pressure in said high pressure side being greater than the pressure in said low pressure stream; and (e) discharging said oxygen enriched dispersion into said source of influent for purposes of oxygenation of said influent to provide a mixed liquor having a dissolved oxygen content of at least 1 mg/l.

4. An improved method for oxygenation of influent in a sewage treatment facility, comprising:

(a) providing a source of influent;

(b) adding an oxygen containing gas to said influent in a treatment zone to provide a mixed liquor;

(c) removing said mixed liquor from said treatment zone to separate solids therefrom to provide a body of treated effluent having a dissolved oxygen (DO) content in the range of a 0.5 to 20 mg/l;

(d) drawing a low pressure stream of treated effluent from said body;

(e) introducing an oxygen-containing gas through a nozzle to said low pressure stream to provide a mixture of treated effluent and gas, the gas introduced countercurrent to flow in said low pressure and at a velocity exiting said nozzle in the range of Mach 1 to Mach 5;

(f) pumping said mixture into a high pressure stream wherein the pressure is maintained in the range of 50 to 3000 psig to obtain an oxygen enriched dispersion having a DO content in the range of 15 to 175 mg/l, the pressure in said high pressure side being greater than the pressure in said low pressure stream; and (g) discharging said oxygen enriched dispersion into said treatment zone, thereby adding said oxygen containing gas to provide said mixed liquor to maintain said DO in the range of 0.5 to 20 mg/l.

5. An improved method for oxygenation of influent in a sewage treatment system, comprising:

(a) providing a source of influent;

(b) adding an oxygen containing gas to said influent in a treatment zone to provide a mixed liquor;

(c) removing said mixed liquor from said treatment zone to separate solids therefrom to provide a body of treated effluent;

(d) drawing a low pressure stream of treated effluent from said body, the stream maintained at a pressure in the range of 5 to 550 psig;

(e) introducing an oxygen-containing gas to said low pressure stream to provide a mixture of treated effluent and gas, the gas introduced in a direction countercurrent to flow in said low pressure stream and the gas introduced at a velocity exiting said nozzle in the range of Mach 1 to Mach 5;

(f) pumping said mixture into a high pressure stream wherein the pressure is maintained in the range of 50 to 3000 psig to obtain an oxygen enriched dispersion having a dissolved oxygen content in the range of 15 to 175 mg/l, the pressure in said high pressure side being greater than the pressure in said low pressure stream; and (g) discharging said oxygen enriched dispersion into said treatment zone, thereby providing said mixed liquor.

6. An improved method for oxygenation of influent in a sewage treatment facility, comprising:

(a) providing a source of influent having a dissolved oxygen (DO) content of less than 3 mg/l;

(b) adding an oxygen containing gas to said influent in a treatment zone to provide a mixed liquor;

(c) removing said mixed liquor from said treatment zone to separate solids therefrom to provide a body of treated effluent;

(d) drawing a low pressure stream of treated effluent from said body, the low pressure stream maintained at a pressure in the range of 35 to 120 psig;

(e) introducing an oxygen-containing gas through a nozzle to said low pressure stream to provide a mixture of treated effluent and gas, the gas introduced in a direction countercurrent to flow of said low pressure stream, the gas introduced at a supersonic velocity exiting said nozzle;

(f) pumping said mixture into a high pressure stream wherein the pressure is maintained in the range of 50 to 3000 psig to obtain an oxygen enriched dispersion having a DO content in the range of 15 to 175 mg/l, the pressure in said high pressure side being greater than the pressure in said low pressure stream; and (g) discharging said oxygen enriched dispersion into said treatment zone, thereby providing said mixed liquor having a DO content of at least 1 mg/l.

* * * * *